US011495039B2

(12) United States Patent
O'Gara et al.

(10) Patent No.: US 11,495,039 B2
(45) Date of Patent: Nov. 8, 2022

(54) PROCESSING DIGITIZED HANDWRITING

(71) Applicant: ACCENTURE GLOBAL SOLUTIONS LIMITED, Dublin (IE)

(72) Inventors: Tara Lynn O'Gara, Chicago, IL (US); Sarat Chandra Gurram, Ghatkopar West (IN); Jeffrey Thomas Turner, Washington, DC (US); Piper Tucker, Chicago, IL (US); James Robert Priestas, Alexandria, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 60 days.

(21) Appl. No.: 17/074,160

(22) Filed: Oct. 19, 2020

(65) Prior Publication Data
US 2022/0122367 A1 Apr. 21, 2022

(51) Int. Cl.
| | |
|---|---|
| *G06F 16/93* | (2019.01) |
| *G06V 30/32* | (2022.01) |
| *G06F 16/248* | (2019.01) |
| *G06F 40/143* | (2020.01) |
| *G06F 40/197* | (2020.01) |

(Continued)

(52) U.S. Cl.
CPC .......... *G06V 30/347* (2022.01); *G06F 16/248* (2019.01); *G06F 16/93* (2019.01); *G06F 40/143* (2020.01); *G06F 40/197* (2020.01); *G06K 9/6253* (2013.01); *G06K 9/6262* (2013.01); *G06V 10/267* (2022.01); *G06V 10/28* (2022.01); *G06V 10/457* (2022.01); *G06V 10/46* (2022.01); *G06V 30/153* (2022.01); *G06V 30/413* (2022.01); *G06V 30/10* (2022.01)

(58) Field of Classification Search
CPC .. G06V 30/347; G06V 30/413; G06V 10/457; G06V 30/153; G06V 10/267; G06V 10/28; G06V 10/46; G06V 30/10; G06F 16/93; G06F 16/248; G06F 40/143; G06F 40/197; G06K 9/6253; G06K 9/6262
USPC ........................................................ 715/229
See application file for complete search history.

(56) References Cited

U.S. PATENT DOCUMENTS

| | | | | |
|---|---|---|---|---|
| 6,363,373 | B1 * | 3/2002 | Steinkraus | ............ G06F 16/313 707/999.005 |
| 8,755,595 | B1 * | 6/2014 | Bissacco | .............. G06K 9/6256 382/159 |

(Continued)

FOREIGN PATENT DOCUMENTS

| | | |
|---|---|---|
| JP | H07114618 A | 5/1995 |
| WO | 2019232852 A1 | 12/2019 |

*Primary Examiner* — Hope C Sheffield
(74) *Attorney, Agent, or Firm* — Mannava & Kang, P.C.

(57) ABSTRACT

A handwritten text processing system processes a digitized document including handwritten text input to generate an output version of the digitized document that allows users to execute text processing functions on the textual content of the digitized document. Each word of the digitized data is extracted by converting the digitized document into images, binarizing the images, and segmenting the images into binary image patches. Each binary image patch is further processed to identify if the word is machine-generated or if the word is handwritten. The output version is generated by combining underlying images of the pages of the digitized document with words from the pages superimposed in a transparent font at positions that coincide with the positions of the words in the underlying images.

20 Claims, 11 Drawing Sheets

(51) Int. Cl.
*G06V 30/413* (2022.01)
*G06V 10/44* (2022.01)
*G06V 30/148* (2022.01)
*G06V 10/26* (2022.01)
*G06V 10/28* (2022.01)
*G06V 10/46* (2022.01)
*G06K 9/62* (2022.01)
*G06V 30/10* (2022.01)

(56) References Cited

U.S. PATENT DOCUMENTS

| | | | | |
|---|---|---|---|---|
| 10,007,863 | B1* | 6/2018 | Pereira | G06T 7/60 |
| 2007/0269109 | A1* | 11/2007 | Ziv-El | H04N 1/3873 |
| | | | | 382/173 |
| 2008/0114757 | A1* | 5/2008 | Dejean | G06F 16/258 |
| | | | | 707/E17.084 |
| 2010/0172590 | A1 | 7/2010 | Foehr et al. | |
| 2012/0066213 | A1* | 3/2012 | Ohguro | G06F 16/3329 |
| | | | | 707/723 |
| 2014/0072225 | A1* | 3/2014 | Ogawa | G06V 30/32 |
| | | | | 382/186 |
| 2016/0179764 | A1* | 6/2016 | Kelso | G06V 30/347 |
| | | | | 715/244 |
| 2017/0109576 | A1* | 4/2017 | Shustorovich | G06V 10/28 |
| 2019/0340341 | A1* | 11/2019 | Fleck | H04W 12/10 |
| 2019/0354756 | A1* | 11/2019 | Gou | G06T 7/11 |
| 2021/0149990 | A1* | 5/2021 | Felt | G06F 40/169 |

* cited by examiner

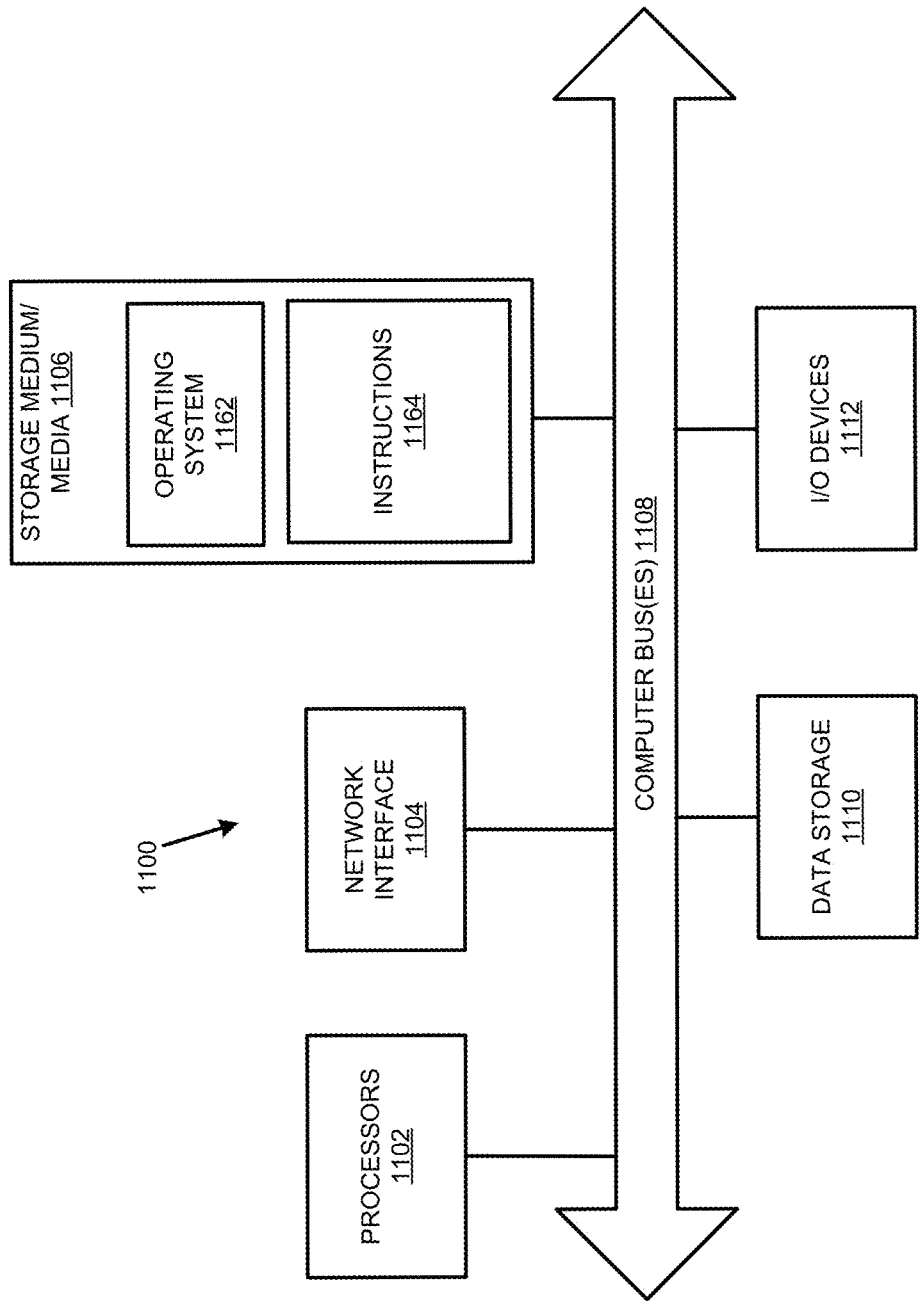

PROCESSING DIGITIZED HANDWRITING

BACKGROUND

Increased usage of digital technologies in various domains has led to the storage and processing of textual and non-textual data. Textual data provided to computer systems for processing is predominantly typed or printed or otherwise generated by machines. However, the development of fields such as robotic process automation (RPA) for automating business processes sometime requires computer processing of documents including handwritten inputs such as notes, forms filled in by human handwriting, signatures, etc. The handwritten inputs can be extracted from images obtained via scanning documents or via human inputs provided through devices such as touchscreens, etc. Handwriting input processing can be complex since different individuals have different writing styles. Machine learning (ML) techniques such as neural networks are currently employed for analyzing handwritten inputs.

BRIEF DESCRIPTION OF DRAWINGS

Features of the present disclosure are illustrated by way of examples shown in the following figures. In the following figures, like numerals indicate like elements, in which:

FIG. 11 illustrates a computer system that may be used to implement the handwritten text processing system in accordance with the examples disclosed herein.

DETAILED DESCRIPTION

Figure 1:
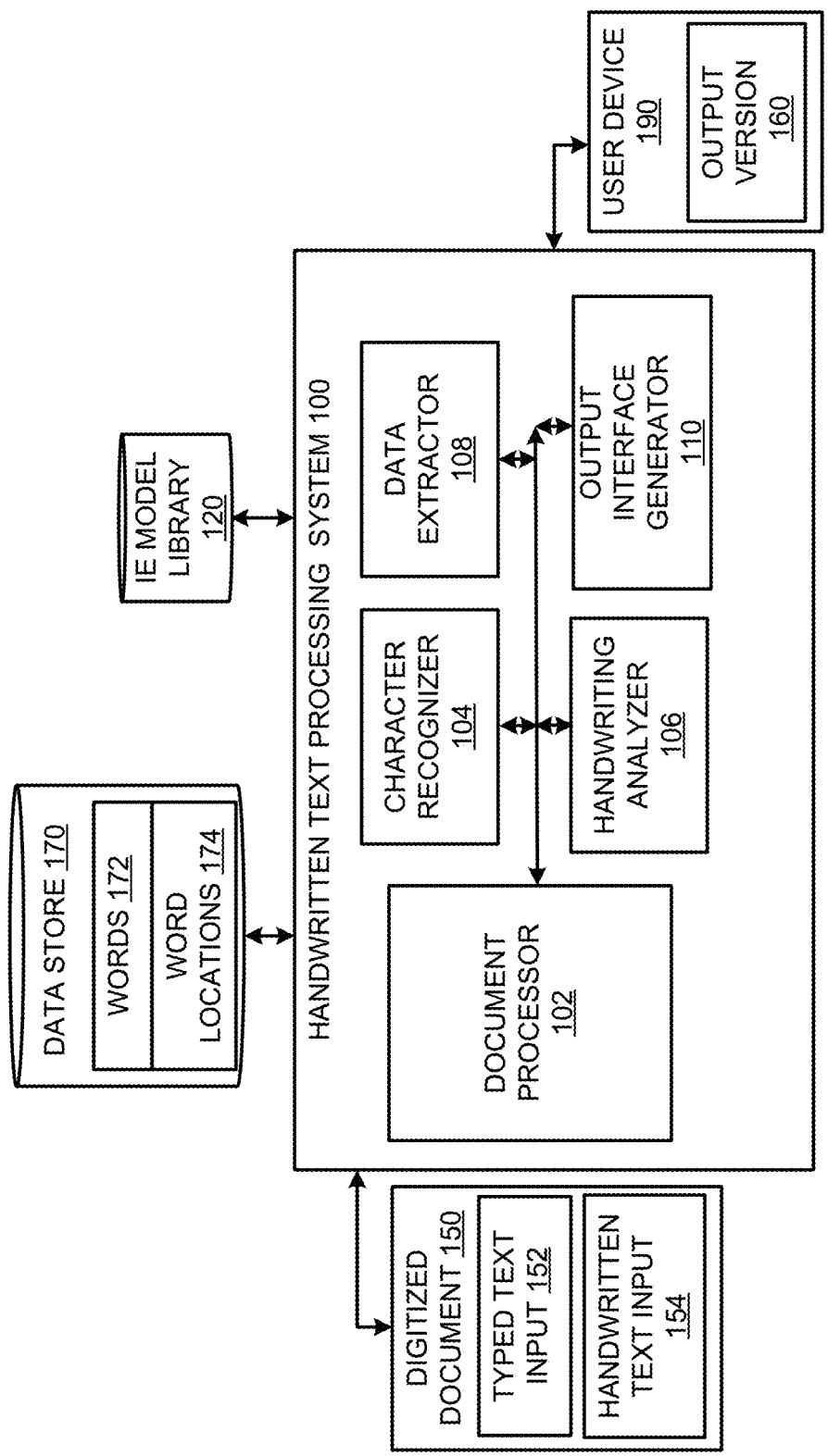
FIG. 1 shows a block diagram of a handwritten text processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A handwritten text processing system that processes digitized documents with data input including handwritten text inputs and enables users to execute text processing functions on the handwritten text input is disclosed. The digitized documents that can be processed by the handwritten text processing system include softcopies (e.g., digitized copies) of paper documents which can further include one or more of machine-processable text and images which are not searchable by machine. Additionally, the content of the digitized document can include one or more of typed or printed text input which is produced by a machine and handwritten text input produced by a human user. The handwritten text processing system accesses the digitized document to produce an output version of the digitized document which enables the text processing functions such as selecting the text, classifying words from the digitized document, etc. The output version of the digitized document includes underlying images of each of the pages from the digitized document with words corresponding to each of the pages superimposed in the transparent text on the underlying image corresponding to that page at positions that coincide with the positions of the words in the page. Transparent text includes words or characters that are transparent or semi-transparent, allowing the image below it to show through. Transparent text provided in a transparent font in a document is not visible unless outlined or otherwise highlighted to make the text visible.

The handwritten text processing system initially generates images for each of the pages in the digitized document. The images are further converted into binary images wherein each pixel value is set to indicate whether or not the pixel is located within the interior shape of a word. The binary images capture shapes of words in the digitized document on a dark background. The binarized images are further segmented into binary image patches to assign specific coordinates to each word in the digitized document. Each word is assigned to one of the binary image patches, such that white pixels in the binary image patch indicate one of a border and an interior of the word on the respective page and black, or dark, pixels in the binary image patch indicate an exterior of the word on the respective page. The binary image patches are further processed for feature extraction. Features such as but not limited to, convex hulls and minimum rectangles can be extracted for the words/binary image patches from the digitized document. Numerical values such as Hu moments are further calculated for each word/binary image patch from the extracted features. Each word is determined to be one of typed/printed text input or handwritten text input based on the Hu moments. The words may be processed differently for identification and determination of positions within the digitized document based on the words being printed or handwritten. Each section of the text from the digitized document is thus segmented into a collection of words. The letters are individually identified from each word and the words are identified using a custom convolutional neural network (CNN).

The handwritten text processing system generates the output version or an output UI on a display of a user device by providing an underlying image of a selected page and superimposing the text from the selected page in the transparent font on the underlying image. When a user executes a search for a specific search term, the words in the transparent font are selected and highlighted. However, since the text in the transparent font is not visible to the user, the highlighted portion appears to the user as if the word is selected from the underlying image regardless of whether the word is typed text input or handwritten text input.

The handwritten text processing system as disclosed herein provides for a technical solution to a technical problem of enabling text processing functions on handwritten inputs in digital documents or images that do not permit machine-processing of their textual content. The various handwriting analyses solutions developed heretofore have predominantly focused on understanding and extracting meaningful textual content from the handwritten inputs but do not adequately address enabling textual processing functions on the documents that include the handwriting inputs. The output UI of the handwritten text processing system as described herein can provide such a solution by maintaining the appearance of the digitized document even as the text processing functions are enabled. As a result, the handwritten text processing system can process not only specific forms that are designed to be processed by the computers but is also able to analyze and process textual input from handwritten forms, letters, or other documents that include both typed and handwritten textual content.

FIG. 1 shows a block diagram of a handwritten text processing system 100 in accordance with the examples disclosed herein. The handwritten text processing system 100 processes documents such as a digitized document 150 including typed text input 152 and handwritten text input 154 to generate output UIs such as an output version 160 of the digitized document 150 that allows user interaction with the typed text input 152 and the handwritten text input 154 via a user device 190. In an example pertaining to the healthcare domain, the digitized document 150 can include an electronic health record (EHR) or an electronic medical record (EMR) of a patient which can include both typed/printed text and handwritten text. Similarly, in an example pertaining to the financial or banking domain, the digitized document 150 can include a loan application with copies of various documents having typed and handwritten text input. Various types of user interactions can be enabled by the output version 160. For example, the output version 160 permits users to search for and identify specific search terms in the digitized document 150. Occurrences of a particular search term can be highlighted throughout the digitized document 150 and displayed within the output version 160 regardless of whether the search term occurs as the typed text input 152 or the handwritten text input 154. Furthermore, other document processing functions such as entity/relationship extractions for classification or building data structures such as knowledge graphs which can further enable automation such as RPAs are also facilitated.

The handwritten text processing system 100 includes a document processor 102, a character recognizer 104, a handwriting analyzer 106, a data extractor 108, and an output interface generator 110. The digitized document 150 is initially analyzed by the document processor 102 to determine if the digitized document 150 includes one of the typed text input 152, the handwritten text input 154, or a combination of the typed text input 152 and the handwritten text input 154. If the document processor 102 determines that the digitized document 150 includes only the typed text input 152, then the digitized document 150 is transmitted to the character recognizer 104 that employs ML techniques such as optical character recognition (OCR) to identify the individual words while also determining the locations of the individual words within the digitized document 150.

If the document processor 102 determines that the digitized document 150 includes a combination of the typed text input 152 and the handwritten text input 154, then the digitized document 150 can be processed by both the character recognizer 104 which processes and outputs the words 172 and their locations i.e., the word locations 174 within the typed text input 152, and the handwriting analyzer 106 can process and output the words and locations of the words in the handwritten text input 154. In an example, the words 172 and the word locations 174 can be stored in a data store 170 that is coupled to the handwritten text processing system 100. However, if the document processor 102 determines that the digitized document 150 includes only the handwritten text input 154 then the digitized document 150 is processed by the handwriting analyzer 106 to identify the individual words (i.e., the words 172) within the handwritten text input 154 and the location of each of the words (i.e., the word locations 174) in the digitized document 150.

The words 172 thus extracted from the digitized document are further processed by the data extractor 108 for data processing tasks such as identifying entities, relationships between the entities, entity classifications, etc. In an example, the data extractor 108 can access libraries with domain-specific information extraction (IE) models to identify and extract the domain-specific entities. By way of illustration and not limitation, healthcare-related entities such as medical terminology, diagnosis codes, conditions, etc., can be extracted from the digitized document 150 using trained IE models from IE model library 120 which can include healthcare-specific model library such as meta map. Additionally, named entity recognition (NER) models can also be included in the IE model library 120 for classifying entities into specific categories. For example, NER models such as trained classifiers can be employed for identifying data such as names, dates, places, etc. The extracted data including the entities and entity relationships, etc. can be used to build knowledge graphs and enable downstream processes such as automated processing of documents e.g., EMRs or loan applications via techniques such as RPA, etc.

The data obtained from the digitized document 150 including the words 172, the word locations 174, the entities, the entity relationships, and any further data structures such as knowledge graphs that may be constructed therefrom are made accessible to the output interface generator 110 to generate the desired output version of the digitized document 150 to be provided to a user device 190. In an example, the output version 160 can be generated to include underlying images that correspond to the pages of the digitized document 150. The underlying images can be substantially similar or even identical to the corresponding pages in terms of appearance and content. The output interface generator 110 additionally provides for a display of text in a transparent font superimposed on the underlying images wherein the transparent text superimposed on each underlying image includes words from the page corresponding to that underlying image placed at positions that coincide with their respective positions on that page. As the superimposed text is in transparent font, the superimposed text is invisible to the user. However, various document processing functions as further described herein can be executed using the output version 160. For example, when a search term is received for identification within the digitized document 150, the transparent text is searched and locations at which the search term is included in the transparent text are highlighted. Since the superimposed text is transparent, the output version 160 provides a display on the user device 190 that appears to highlight the word, e.g., the handwritten text from the underlying image. In different instances, the user device 190 may be disparate from the computer system executing the handwritten text processing system 100 and may be connected to the computer system executing the handwritten text processing system 100 via a network, or the output version 160 may be displayed on the same computer system executing the handwritten text processing system 100.

Figure 2:
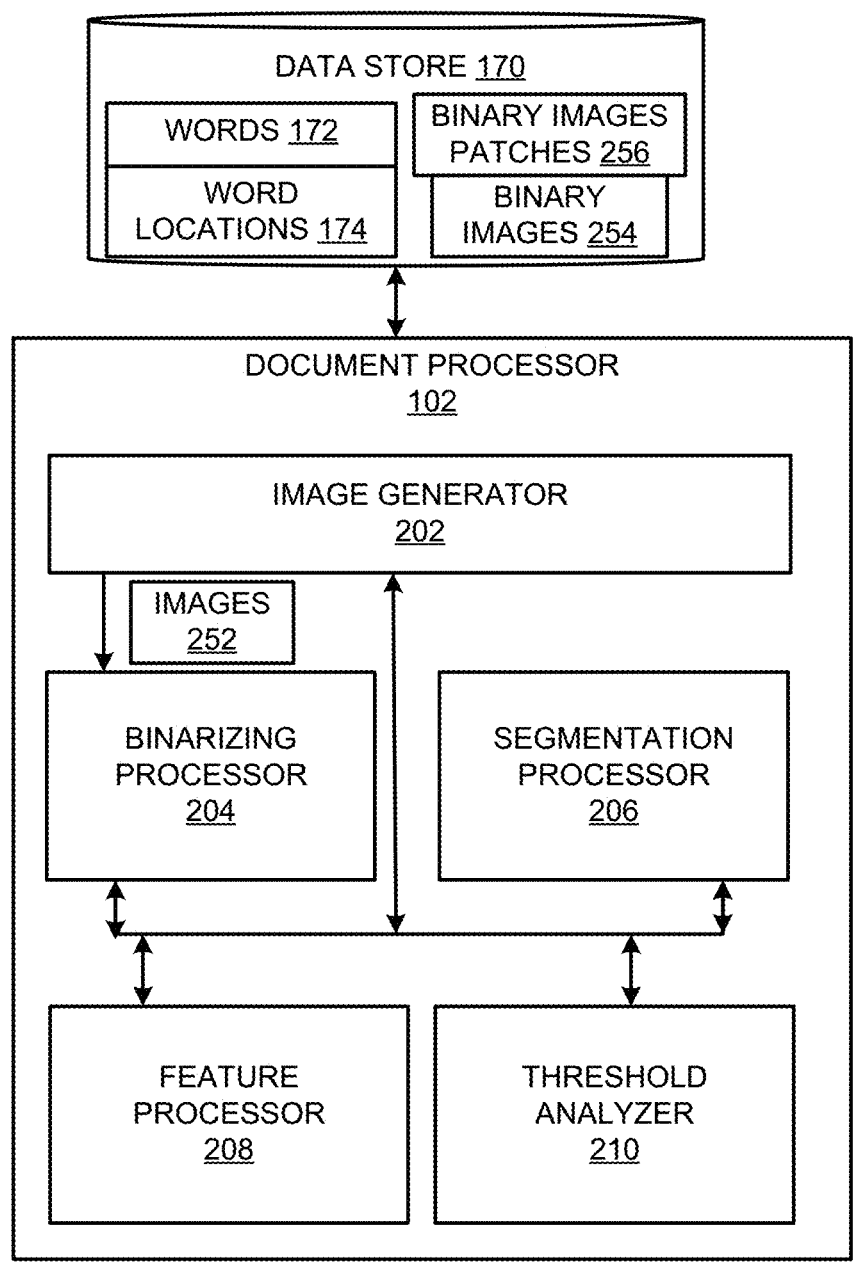
FIG. 2 shows a block diagram of a document processor in accordance with the examples disclosed herein.

FIG. 2 shows a block diagram of the document processor 102 in accordance with the examples disclosed herein. The document processor 102 includes an image generator 202, a binarizing processor 204, a segmentation processor 206, a feature processor 208, and a threshold analyzer 210. When the digitized document 150 is initially received, the image generator 202 generates images 252 of the digitized document 150 wherein each image corresponds to a page of the digitized document 150. Therefore, if the digitized document 150 includes 'n' pages (where n is a natural number and n=1, 2, . . . ), 'n' images each corresponding to a page of the digitized document 150 and having the same size as the page are generated by the image generator 202.

The images 252 thus generated are accessed by the binarizing processor 204 which uses a technique for turning a scanned document (or the images 252) into a binarized image where each pixel's location is represented as 0 if the pixel is not within the interior shape of a word or 1 if the pixel is within the interior shape of the word. Therefore, the binarizing processor 204 generates 'n' binary images corresponding to the 'n' images obtained from the image generator 202. The binarizing processor 204 enables capturing the shape of the outline of each of the words from each of the binary images on a black background. The segmentation processor 206 is configured to assign specific coordinates to a word indicative of the position of the word within the binary image that includes the word. The segmentation processor 206 can employ return values from methods/functions such as DOCUMENT_TEXT_ANNOTATION to store the x, y coordinates along with the width and height of each word within the binarized image. The segmentation processor 206 further crops each word based on the coordinates and the height, width attributes to be stored as a "binary image patch". The words in the binarized images are converted into the corresponding binary image patches 256. In an example, the area of each of the binary image patches may cover a few pixels.

The feature processor 208 accesses the binary image patches 256 for extracting features so that each binary image patch can be represented by a corresponding vector of numbers. Obtaining such numerical representations (i.e., the vectors) enables using ML techniques to classify the words. The 2D human-readable format of an image is turned by the feature processor 208 into a list of properties (e.g., rectangle area, hull perimeter, 3rd order Hu moments, etc.) that can be interpreted by a computer system. The threshold analyzer 210 accesses the properties from the feature processor 208 to determine if each of the binary image patches 256 includes typed text or handwritten text based on a comparison of the properties (e.g., Hu moments) with predetermined thresholds. As mentioned above, if a binary patch is determined to include typed text then it is provided to the character recognizer 104 for processing and if the binary patch is determined to include handwritten text, it is provided to the handwriting analyzer 106 for processing.

Figure 3:
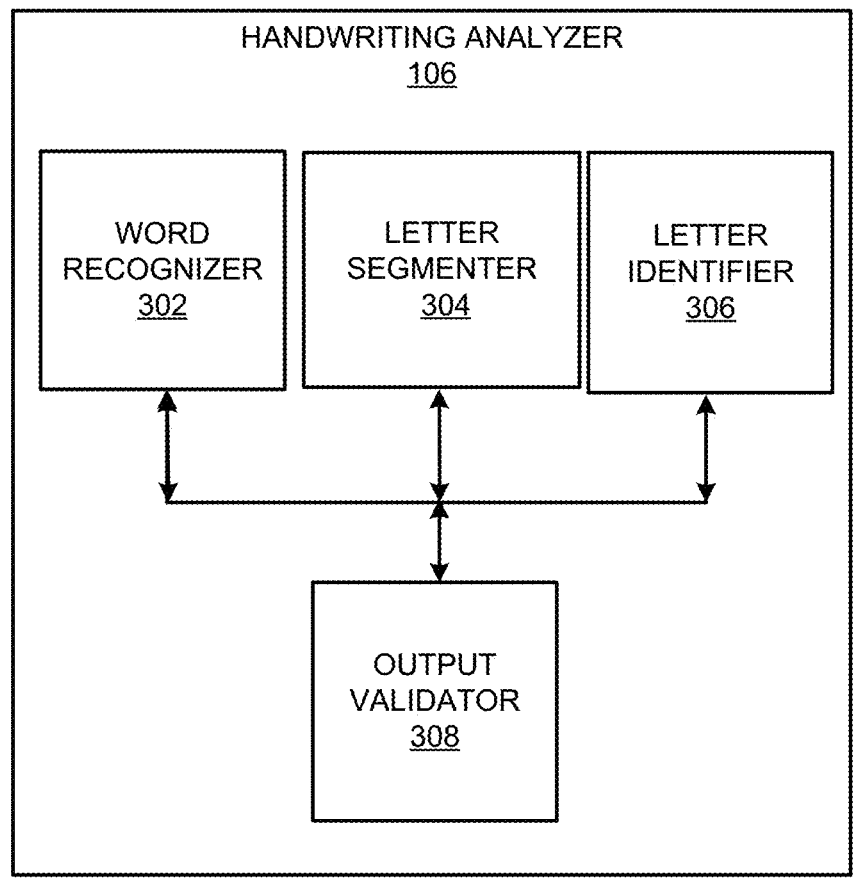
FIG. 3 shows a block diagram of a handwriting analyzer in accordance with the examples disclosed herein.

FIG. 3 shows a block diagram of the handwriting analyzer 106 in accordance with the examples disclosed herein. The handwriting analyzer 106 includes a word recognizer 302, a letter segmenter 304, a letter identifier 306, and an output validator 308. As discussed above, the text in each of the images 252 that correspond to the pages of the digitized document 150 is segmented into binary image patches 256 each of which can be identified by the word recognizer 302 as including a word of the text thereby generating collections of words from the digitized document 150. The letter segmenter 304 segments individual letters from the individual words using contours based on patterns that follow the vertical movements of a letter's main body. The letter identifier 306 includes trained convolutional neural networks (CNNs) that provide the highest confidence value for each which can be used to identify the letter. The CNN can be trained to identify the best possible candidate across different dimensions such as numbers, alphabets, etc. The output validator 308 can employ custom models to validate the cursive output from a handwritten binary image patch against an expected response to increased accuracy. For example, a customer classifier can be trained to identify cities and therefore may be used to extract information regarding a city from the binary image patch. Similarly, custom models can be employed to identify and validate states, countries, zip codes, etc.

Figure 4:
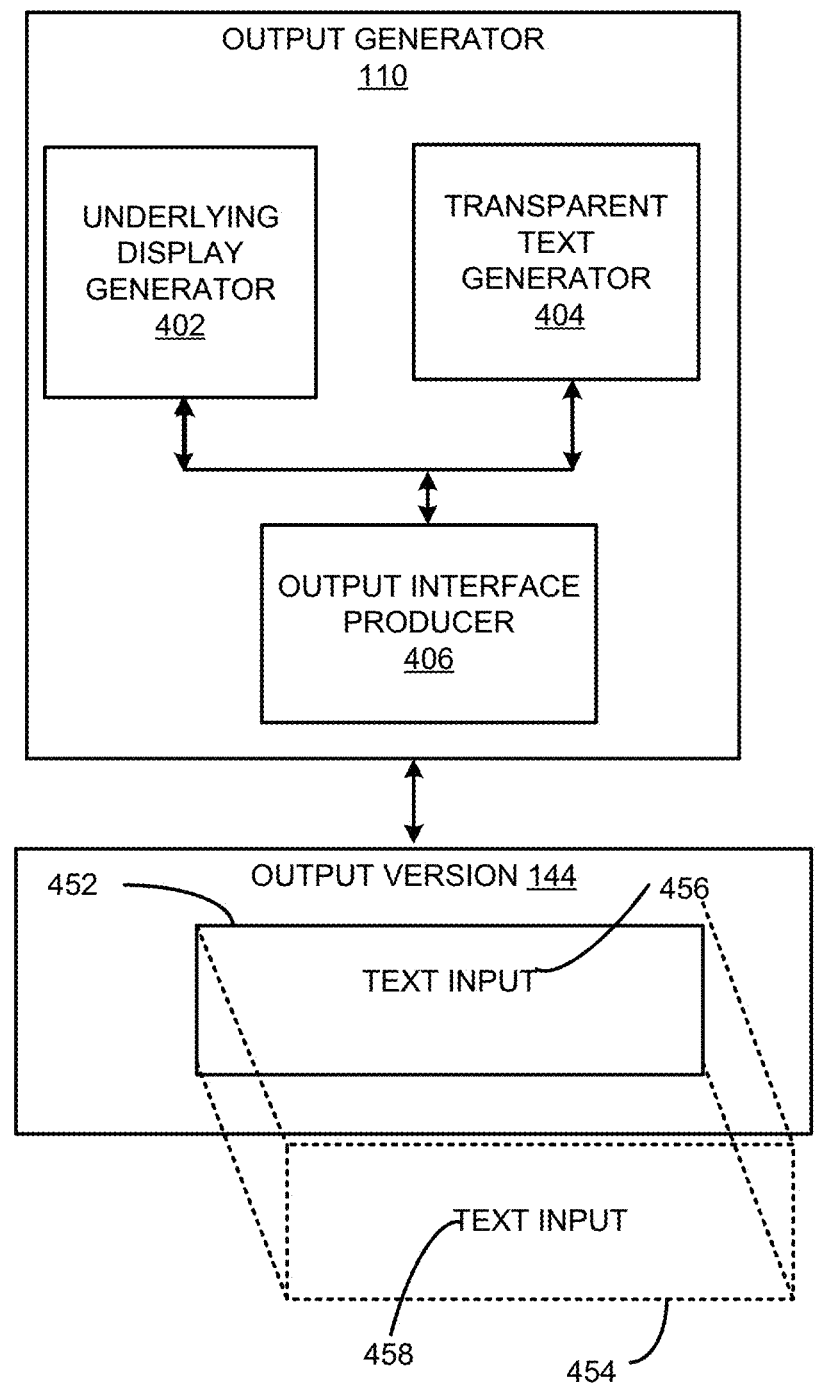
FIG. 4 shows a block diagram of an output generator in accordance with the examples disclosed herein.

FIG. 4 shows a block diagram of the output interface generator 110 in accordance with examples disclosed herein. The output interface generator 110 includes an underlying display generator 402, a transparent text generator 404, and an output interface producer 406. The output version 160 of the digitized document 150 includes content that is substantially similar or even identical to the digitized document 150. More particularly, the output version 160 includes the images 252 that correspond to the pages of the digitized document 150 set as underlying images by the underlying display generator 402 and text from each of the pages of the digitized document 150 generated by the transparent text generator 404 in the transparent font. The output interface producer 406 superimposes the text in the transparent font for each page on an underlying image corresponding to that page. The superimposed text includes words from each of the pages of the digitized document 150 superimposed on the corresponding underlying image at locations or positions that correspond to their respective positions on the page. The output version 160 enables different user interactions which would not be possible with the digitized document 150 that is received as input by the handwritten text processing system 100. For example, the user may search for and identify occurrences of a specific search term within the output version 160. The output version 160 provides a display of the digitized document 150 with the locations of the search term highlighted therewithin. In an example, the user can scroll through the output version 160 to view the various occurrences of the search term within the digitized document 150. Alternately, the output version 160 can allow the user to jump to the locations where the search term is included in the digitized document 150. Such user interactions are made possible by superimposing transparent text on top of an image of the digitized document 150.

To provide the user with a display of a selected page with the search term highlighted, the underlying display generator 402 produces an underlying image 452 selected from the images 252 that corresponds to the selected page. The transparent text generator 404 generates text 458 based on the words identified by one or more of the character recognizer 104 and the handwriting analyzer 106. The text 458 is identical in terms of content, size, and position to the text 456 included in the selected page from which the underlying image 452 was generated. The output interface producer 406 is configured to combine the underlying image 452 and the text 454 so that each word from the text 454 is superimposed on the underlying image 452 at a location that coincides with the location of the word in the selected page. In an example, the output interface producer 406 can use Hypertext Markup Language (HTML) to combine the underlying image 452 and the text 454 at the corresponding locations so that the word from the text 454 is displayed on top of the word from the underlying image 452. Furthermore, the output interface producer 406 is configured for setting the Red, Green Blue, alphaTransparency (RGBa) font properties of the text 454. In an example, the RGBa values can be set to R=0, B=0, G=0 and a=0.01 so that the text 454 becomes transparent and remains invisible to the user.

Figure 5:
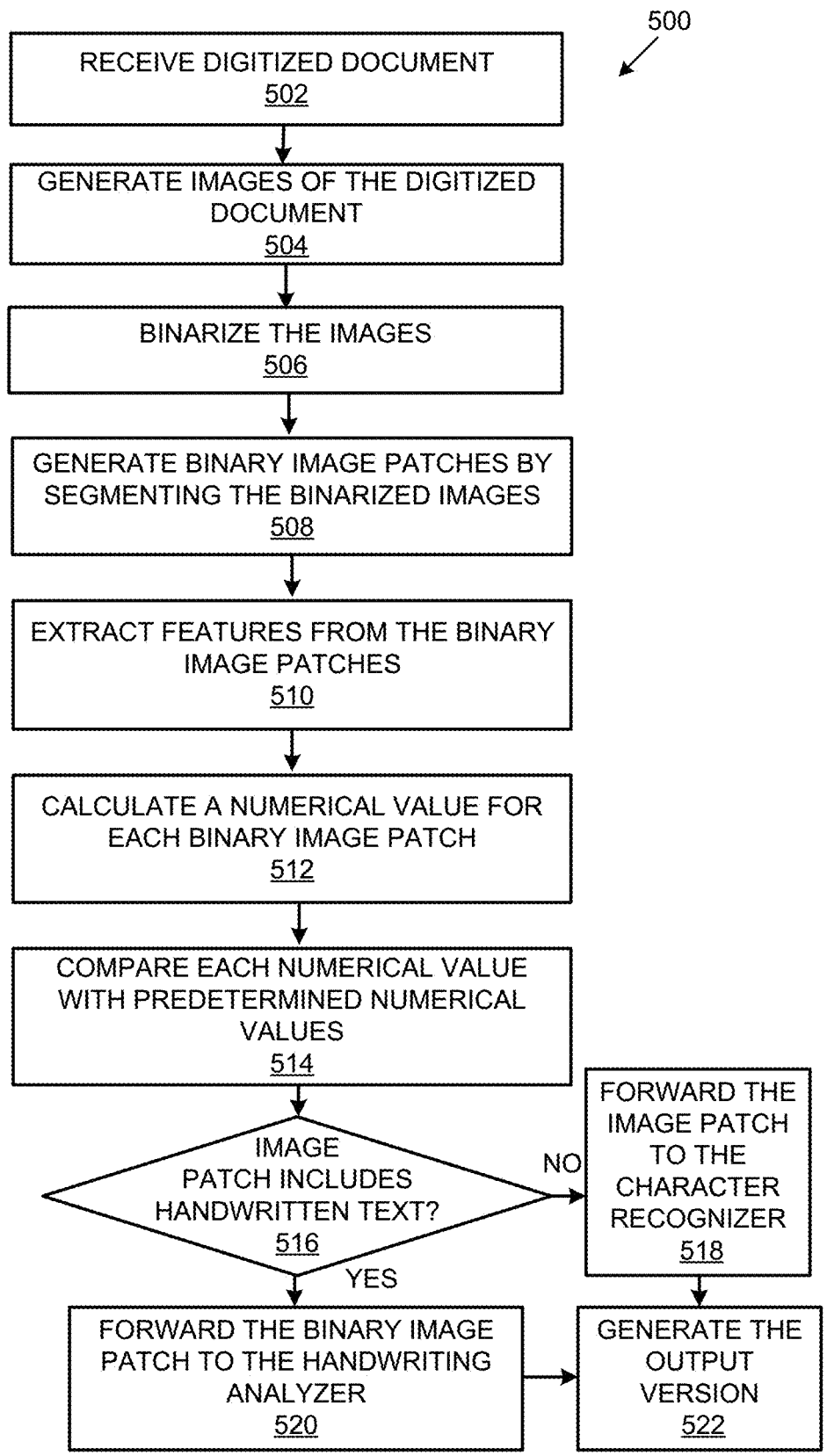
FIG. 5 shows a flowchart that details a method of determining the nature of the input in a digitized document in accordance with the examples disclosed herein.

FIG. 5 shows a flowchart 500 that details a method of determining the nature of the input in the digitized document 150 in accordance with examples disclosed herein. The method begins at 502 wherein the digitized document 150 is received. The digitized document 150 can be received via email, via an upload, or can be accessed by the handwritten text processing system 100 automatically from a network location. At 504, one or more images of the digitized document 150 are generated wherein each image corresponds to a page of the digitized document 150 and each image maintains the same size as the page of the digitized document 150. Each of the images is binarized at 506 to generate the binary images 254 or black-and-white images of the pages of the digitized document 150. The binary images 254 are segmented at 508 to generate the binary image patches 256 so that each binary image patch includes a word of the text from the digitized document 150. Different features such as convex hull, minimum rectangle, etc., are extracted at 510 from each of the binary image patches 256. Convex hull can be described as the smallest convex polygon that encloses the word in a given binary image patch. Different techniques such as but not limited to Graham's scan or Jarvis' march can be used to obtain the convex hull. The minimum rectangle that can enclose the word in the binary image patch can be obtained using techniques such as the rotating calipers method, etc. A numerical value such as Hu moments of the convex hull can be calculated at 512 for each of the binary image patches 256 from the corresponding features. The numerical value obtained at 512 is compared with one or more predetermined numerical values at 514. Based on the comparison at 514, the binary image patch may be determined at 516 to include typed text input 152 or handwritten text input 154. If the numerical value i.e., the Hu moments of the convex hull and the minimum rectangle are closer to the predetermined numerical values for the typed text input then the binary image patch is determined to include typed text, and the binary image patch is forwarded at 518 to the character recognizer 104 for further processing. If the Hu moments of the convex hull and the minimum rectangle are closer or similar to the predetermined numerical values for handwritten examples then the binary image patch is determined to include handwritten text and the binary image patch is forwarded at 520 to the handwriting analyzer 106 for further processing. The output version 160 is generated at 522 in accordance with the examples described above.

Figure 6:
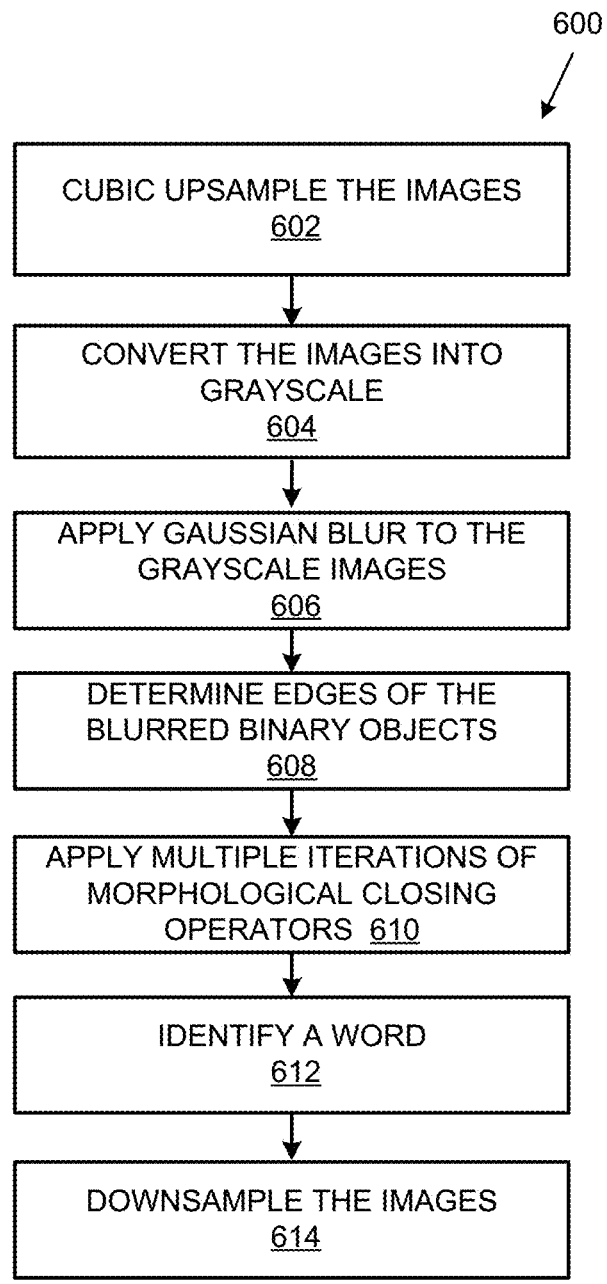
FIG. 6 shows a flowchart that details a method of binarizing images in accordance with the examples disclosed herein.

FIG. 6 shows a flowchart 600 that details a method of binarizing images in accordance with the examples disclosed herein. The method begins at 602 with the cubic upsampling of each of the images 252 by a predetermined factor. In an example, each of the binary images 254 are processed for cubic upsampling by a factor of two to increase both the width and the height of each of the binary images 254 so that the image signals can be processed at an artificial, higher fidelity than the fidelity of the images 252 obtained from the digitized document 150. At 604, the images 252 are converted into greyscale ("z") using the following formula of the original RGB image:

$$z_{x,y}=0.299*r_{x,y}+0.114*b_{x,y}+0.587*g_{x,y} \forall \{x,y\} \in |r,g,b \qquad \text{Eq. (1)}$$

The greyscale image conversion enables the canny operators and the morphological closing operators to be able to process a single channel signal (i.e., gray) to determine lines and corners in the images 252 as these are often a combination of three colors.

At 606, Gaussian blur is applied to the greyscale images using a 3×3 kernel. The purpose of the Gaussian blur is to act as a low pass filter on the images 252 to de-noise artifacts that may have been introduced during the printing or scanning processes by which the digitized document 150 is created. At 608, the Canny edge detection technique is used to find the edges of the blurred binary objects that are produced. Every edge (i.e., the boundary between the black ink and the white paper) can be identified and an outline of the word can be obtained from the edges. This is used for classifying the word as a handwritten or typed word. At 610, multiple iterations of the "morphological closing" operators enable producing connected solid word blobs out of the edges from the Canny operators. A large blob from the blobs thus generated with no holes can be identified as a "word" at 612. At 614, the images are then down-sampled using techniques such as bilinear interpolation with coefficient values (1,0). The downsampling reverses the up-sampling of the images at 602 so that the remaining processes such as segmentation, featurization, etc., can be executed on the images at their original sizes.

Figure 7:
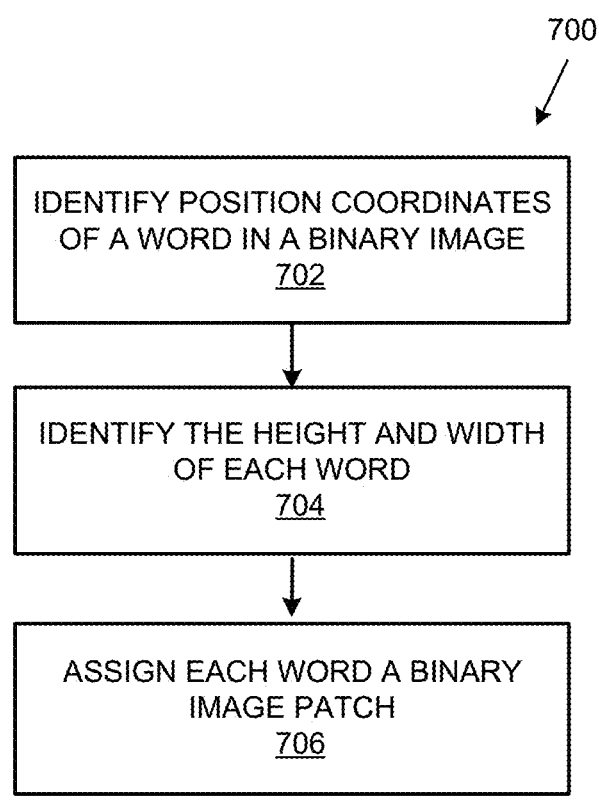
FIG. 7 shows a flowchart that details a method of segmenting the binary images in accordance with the examples disclosed herein.

FIG. 7 shows a flowchart 700 that details a method of segmenting the binary images 254 into binary image patches 256 in accordance with the examples disclosed herein. The method begins at 702 wherein the location coordinates (or position coordinates (x, y)) of a word within the binary image are identified. At 704, the height (h) and width (w) of the word are also identified. In an example, the return values from functions such as DOCUMENT_TEXT_ANNOTATION can be used to determine the position coordinates and the height/width of each of the words in the binary images 254 obtained from the digitized document 150. Each word is assigned a "binary image patch" at 706 with the height and width that may be measured in a few pixels. The individual word pixels that are cropped from the digitized document 150 to generate the corresponding binary image patches can include white pixels in the binary image patch indicative of a border or an interior of the word on the page (or the binary image) while the black pixels indicate the exterior of the word on the binary image.

Figure 8:
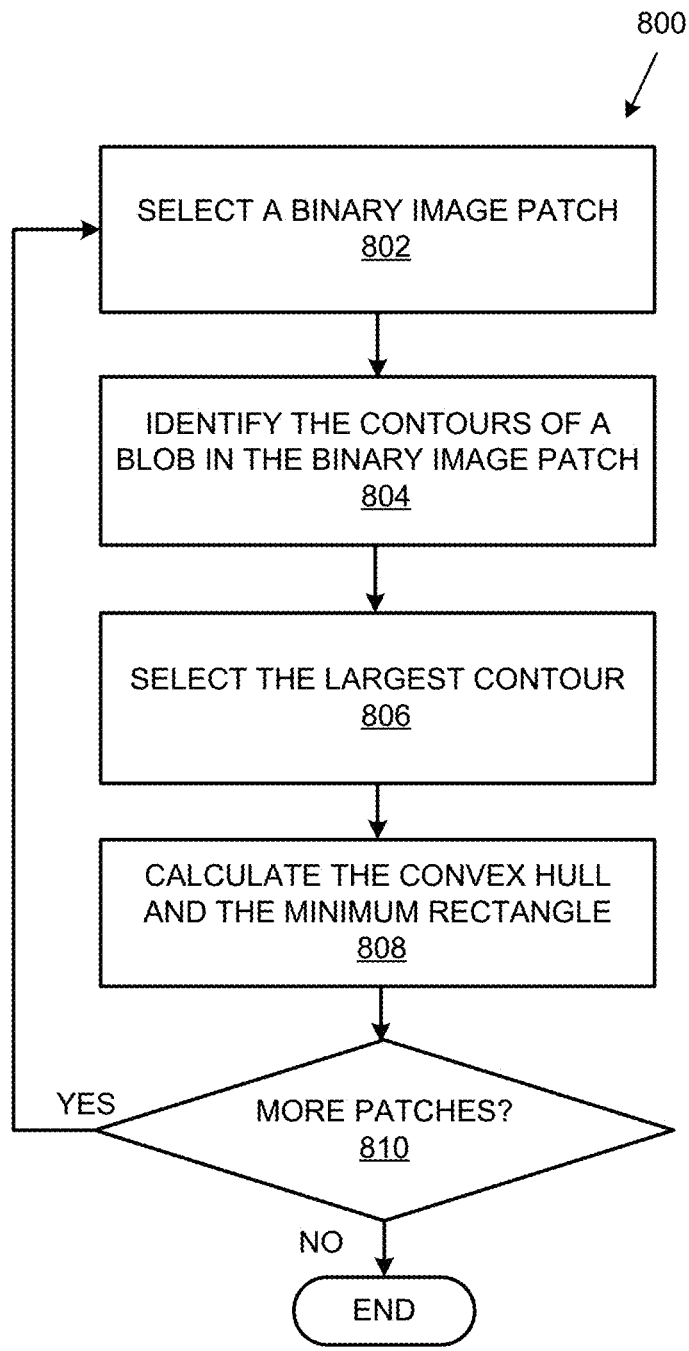
FIG. 8 shows a flowchart that details a method of extracting features from binary image patches in accordance with the examples disclosed herein.

FIG. 8 shows a flowchart 800 that details a method of extracting features from the binary image patches in accordance with the examples disclosed herein. Each of the binary image patches is turned into a vector so that the ML methods can be used to process the words. At 802, one of the binary image patches 256 is selected. The contours of all the blobs present in a binary image patch are identified at 804. The largest contour is selected at 806 while the remaining contours are discarded from further processing. The Gaussian blur applied during the binarization process generally combines letters from the same word into the same blob without combining the letters from different words so that the blobs remain distinct and separate. The largest blob present can represent the underlying word. At 808, the convex hull and the minimum rectangle are calculated for the largest word contour. At 810, it is determined if more binary image patches remain for processing. If it is determined at 810 that more binary images remain for processing, the method returns to 802 to select the next binary image patch, else the method terminates on the end block. It can be appreciated that the processing of the binary image patches for feature extraction is described as a serial process for illustration purposes only and that more than one binary image patch can be processed simultaneously or in parallel for feature extraction.

Figure 9A:
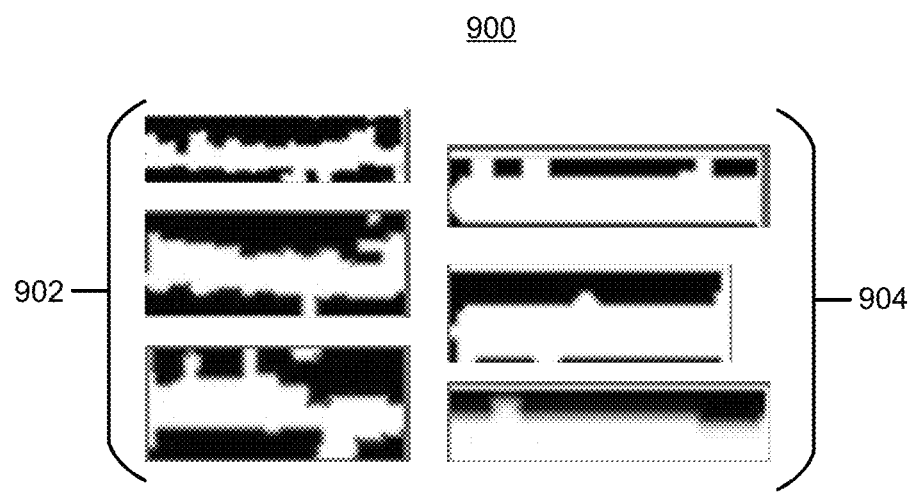
FIG. 9A shows segmented word shapes in accordance with the examples disclosed herein.

FIG. 9A shows segmented word shapes 900 in accordance with the examples disclosed herein. The left-hand side (LHS) 902 shows edges detected from binary image patches or segmented word shapes that include handwriting input. The right-hand side (RHS) includes binary image patches with typewritten input. Upon up-sampling the images 252 from the digitized document, it can be seen that the word boundaries on the LHS 902 are uneven and jagged with irregular line segment lengths and large perimeter-to-area ratios and while the word boundaries on the RHS 904 are smoother. The smoother word boundaries are generally characteristic of machine-generated, printed, or typewritten input. The extracted features are based on such characteristics that enable the document processor 102 to differentiate the typed text input 152 from the handwritten text input 154.

Figure 9B:
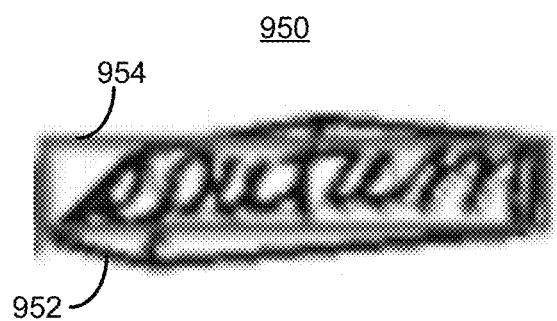
FIG. 9B shows a convex hull and a minimum rectangle obtained for a word sample in accordance with the examples disclosed herein.

FIG. 9B shows the convex hull and minimum rectangle obtained from a word sample 950 in accordance with the examples disclosed herein. The minimum rectangle 952 and the convex hull 954 are calculated to convert the 2D human-readable cursive shape of the word 'sputum' in the word sample 950 into a list of properties that can be interpreted by a computer. Example properties can include but are not limited to rectangle area, hull perimeter, 3rd order Hu moment, etc. The values of the example properties of the word sample 950 when compared to the corresponding values of the example properties of the typewritten and handwritten samples. If the Hu moments of the convex hull and minimum rectangle are more similar to the handwritten values, a positive value is added. If the Hu moments of the convex hull and minimum rectangle are more indicative of a typed word sample, a value can be subtracted from an overall calculated value. If the combination of these two values is positive, the word can be classified as handwritten. If the combination of these two values is negative, then the word can be classified as typed text input.

Figure 10:
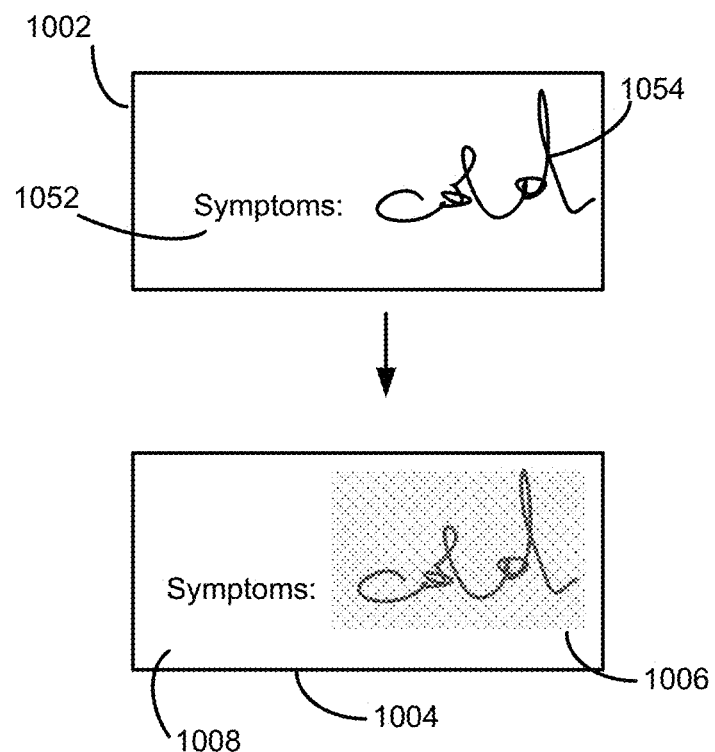
FIG. 10 shows a portion of an output user interface (UI) generated from a corresponding portion of an input digitized document in accordance with the examples disclosed herein.

FIG. 10 shows a portion of an example of the output version 160, such as an output UI 1004 generated from a corresponding portion of an input digitized document 1002. The output UI 1004 displays an underlying image 1008 of the input digitized document 1002 as received with the data inputs that include the typewritten text input 1052 and the handwritten text input 1054. However, the handwritten text processing system 100 enables additional text processing functions so that the text obtained from the input digitized document 1002 can be extracted, selected, classified, or otherwise processed. The handwritten text processing system 100 may also enable text processing functions on any images that may be included in the input digitized document 1002 which may include text such as logo names, brand names, slogans, etc. that may be included in the document headers, footers, stamps, etc. More particularly, the output UI 1004 shows the function of text selection as enabled by the handwritten text processing system 100. The selection 1006 can include the word 'cold' in the handwritten text 1054 in the portion of the output UI 1004 based, for example, on a search term issued by a user, etc. The output UI 1004 includes an underlying image of the portion of the input digitized document 1002 including the word 'cold' while the selection 1006 includes transparent font superimposed on the underlying image which is invisible to the user and hence provides a display that appears to the user as if the actual underlying handwritten text 1054 is selected. In an example, the font size to be overlaid on handwritten input may be set based on the size (height and width) of the corresponding word/binarized image patch as determined by the segmentation processor 206 so that an area of the selection 1006 may be correspondingly sized. The highlighted portions (e.g., the selection 1006) can be therefore sized to cover selected words from the underlying image 1008 wherein the selected words correspond to the search term 'cold' regardless of whether the search term occurs in the typed text input or the handwritten text input. The handwritten text processing system 100 is therefore configured to provide the output UI 1004 that displays input documents while enabling text processing functions on such output UI displays.

FIG. 11 illustrates a computer system 1100 that may be used to implement the handwritten text processing system 100. More particularly, computing machines such as desktops, laptops, smartphones, tablets, and wearables which may be used to generate or access the data from the handwritten text processing system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be a non-transitory or non-volatile medium, such as a magnetic disk or solid-state non-volatile memory or volatile medium such as RAM. The instructions or modules stored on the processor-readable medium 1106 may include machine-readable instructions 1164 executed by the processor(s) 1102 that cause the processor(s) 1102 to perform the methods and functions of the handwritten text processing system 100.

The handwritten text processing system 100 may be implemented as software stored on a non-transitory processor-readable medium and executed by the one or more processors 1102. For example, the processor-readable medium 1106 may store an operating system 1162, such as MAC OS, MS WINDOWS, UNIX, or LINUX, and code 1164 for the handwritten text processing system 100. The operating system 1162 may be multi-user, multiprocessing, multitasking, multithreading, real-time, and the like. For example, during runtime, the operating system 1162 is running and the code for the handwritten text processing system 100 is executed by the processor(s) 1102.

The computer system 1100 may include a data storage 1110, which may include non-volatile data storage. The data storage 1110 stores any data used by the handwritten text processing system 100. The data storage 1110 may be used to store the digitized documents, the images generated from the digitized documents, the binarized image patches, features extracted from the binarized image patches, etc., and other data that is used or generated by the handwritten text processing system 100 during operation.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A computer-implemented processing system for processing handwritten text, comprising:
at least one data storage device, and
one or more processors executing machine-readable instructions stored in the at least one storage device to:
access a digitized document,
the digitized document comprising data inputs, and
the data inputs including a handwritten text input;
convert the digitized document into images,
each of the images corresponding to a respective page of the digitized document, and
each of the images maintaining a same size as the respective page of the digitized document;
calculate numerical values for the data inputs from the images of the digitized document;
determine, based on the numerical values, that at least one of the data inputs includes the handwritten text input;
identify words and a respective location of each word in the data inputs of the digitized document;
generate an output version of the digitized document,
the output version of the digitized document for display on an output screen of a user device,
where the output version enables selection of the data inputs including the handwritten text input, and
where the output version includes:
the images that correspond to the pages of the digitized document set as underlying images; and
text from each of the pages of the digitized document superimposed in transparent font on a corresponding underlying image of the underlying images corresponding to the page,
where the text includes the identified words from the page displayed in the transparent font at locations that coincide with respective locations of the identified words in the corresponding underlying image; and
enable text processing functions on the digitized document by providing the output version of the digitized document to the user device for display.

2. The handwritten text processing system of claim 1, where the processor is to further:
receive a search term for identification within the digitized document; and
identify locations at Which the search term is included in the digitized document.

3. The handwritten text processing system of claim 2, where to enable the text processing functions the processor is to:
generate the output version of the digitized document including highlighted portions of the transparent font that include selected words corresponding to the search term,
where the highlighted portions are sized to cover the selected words on the underlying image.

4. The handwritten text processing system of claim 1; where to enable the text processing functions the processor is to:
extract one or more entities from the words in the digitized document using information extraction (IE) models; and
classify the entities into specific categories using trained classifiers.

5. The handwritten text processing system of claim 4, where to generate the output version of the digitized document the processor is to:
generate the output version of the digitized document by highlighting the entities within the transparent font at the locations at which the entities are included in the digitized document.

6. The handwritten text processing system of claim 1, where to process the digitized document the processor is to:
capture a shape of an outline of each word in the digitized document by binarizing the images generated from the digitized document.

7. The handwritten text processing system of claim 6, where to binarize the digitized document the processor is to:
increase a width and height of each of the images by a predetermined factor;
convert each of the images to greyscale; and
generate blurred binary objects by applying Gaussian Blur to each of the images.

8. The handwritten text processing system of claim 7, where to binarize the digitized document the processor is to:
determine edges of the blurred binary objects in each of the images using a Canny edge detection technique; and
generate connected, solid word blobs of the edges by applying multiple iterations of morphological closing operators.

9. The handwritten text processing system of claim 1, where to process the digitized document the processor is to:
segment individual word pixels from binary images obtained by binarizing the images.

10. The handwritten text processing system of claim 9, where to segment the individual word pixels the processor is to:
obtain locations and sizes of the words in the binary images; and
assign a corresponding binary image patch to each of the words,
where white pixels in the binary image patch indicate one of a border and an interior of the word on the respective page, and
black pixels in the binary image patch indicate an exterior of the word on the respective page.

11. The handwritten text processing system of claim 10, where to process the digitized document the processor is to:
extract features for each of the binary image patches by:
identifying contours of solid word blobs included in the binary image patch;
selecting a largest contour for the binary image patch; and calculating convex hulls and minimum rectangles for word contours in the binary image patch.

12. The handwritten text processing system of claim 11, where to determine that the data inputs includes at least the handwritten text input, the processor is to:
calculate Hu moments for the convex hulls and the minimum rectangles of the binary image patches as the numerical values for the data inputs; and
determine that the data inputs include at least the handwritten text input based on a determination that the Hu moments of the convex hulls and the minimum rectangles are similar to values for handwritten examples.

13. The handwritten text processing system of claim 1, where to identify each word and location of each word in the digitized document the processor is to:
segment text from each of the images into collections of words based on contours of word blobs and breaks in the text;
further, break each word into letters using the contours;
identify individual letters using trained convolutional neural networks (CNNs);
obtain output from identifying the individual letters by applying custom models; and
validate the output obtained from identifying the individual letters against expected response.

14. A method of processing handwritten text input, comprising:
generating images that correspond to each page of a digitized document Where the images have same sizes as the pages of the digitized document;
converting the images to binary images that capture shapes of words in the digitized document on a dark background;
segmenting the binary images into binary image patches, where each of the binary image patches includes a corresponding word from the digitized document;
extracting features for each of the binary image patches;
calculating numerical values for data inputs of the digitized document from the features of the images;
determining that the data inputs include at least handwritten text input based on the numerical values;
identifying words and positions of the words in the digitized document; and
generating an output version of the digitized document that enables user selection of the words including words in the handwritten text input, where the output version includes at least:
one or more underlying images corresponding to the images of the pages of the digitized document; and
text from at least one of the pages superimposed in transparent font on the corresponding underlying image of the page,
where the identified words from the at least one page of the digitized document are superimposed in the transparent font at positions that coincide with the positions of the identified words in the corresponding underlying image;
providing the output version of the digitized document to a user device for display.

15. The method of claim 14, where converting the images to the binary images further includes:
increasing a width and height of each of the images by a predetermined factor;
converting each of the images to greyscale;
generating blurred binary objects by applying Gaussian Blur to each of the images;
determining edges of the blurred binary objects in each of the images using Canny edge detection technique; and
generating connected word blobs of the edges by applying multiple iterations of morphological closing operators.

16. The method of claim 14, where segmenting the binary images into the binary image patches further includes:
obtaining locations and sizes of each individual word in the binary images;
assigning a corresponding binary image patch to each individual word where white pixels in the binary image patch indicate one of a border and an interior of the word on the respective page and black pixels in the binary image patch indicate an exterior of the word on the respective page; and
cropping individual word pixels from the binary images.

17. The method of claim 14, where generating the output version of the digitized document further includes:
combining the underlying image and the text using Hypertext Markup Language (HTML); and
setting values of the transparent HTML in the HTML that cause the font to be invisible to a user viewing the output version on the user device.

18. A non-transitory processor-readable storage medium comprising machine-readable instructions that cause a processor to:
access a digitized document with data inputs including handwritten text input;
convert the digitized document into images,
where each of the images corresponds to a respective page of the digitized document and
each of the images maintains a size proportional to the respective page of the digitized document;
calculate numerical values for the data inputs from the images of the digitized document;
determine that at least one of the data inputs includes the handwritten text input based on the numerical values;
identify words and locations of the words in the digitized document;
receive a search term for identification from the digitized document;
generate an output version of the digitized document,
where the output version enables selection of the data inputs including the handwritten text input and
where the output version includes:
an underlying image selected from the images, where the underlying image corresponds to at least one selected page of the digitized document including the search term;
text from the underlying image superimposed in transparent font on the underlying image,
where the text includes at least a subset of the identified words from the selected page displayed in the transparent font at locations that coincide with the locations of the identified words in the underlying image; and
provide the output version of the digitized document to an output screen of a user device for display.

19. The non-transitory processor-readable storage medium of claim 18, further comprising instructions that cause the processor to:
identify locations at which the search term appears in the digitized document; and
provide the output version of the digitized document that includes highlighted portions of the transparent font in the digitized document wherein the highlighting appears as if the subset words are selected on the underlying image.

20. The handwritten text processing system of claim 1, wherein to display the text that includes words from the page in the transparent font the processor is to further:
 generate the transparent font by setting Red, Green, Blue, and alpha Transparency (RGBa) font properties of the transparent font via Hypertext Markup Language (HTML).

\* \* \* \* \*

UNITED STATES PATENT AND TRADEMARK OFFICE
CERTIFICATE OF CORRECTION

PATENT NO. : 11,495,039 B2
APPLICATION NO. : 17/074160
DATED : November 8, 2022
INVENTOR(S) : Tara Lynn O'Gara et al.

It is certified that error appears in the above-identified patent and that said Letters Patent is hereby corrected as shown below:

In the Claims

At Claim 2, Column 11, Line 66, the phrase "at Which the" should instead read "at which the".

At Claim 4, Column 12, Line 10, the phrase "claim 1; where" should instead read "claim 1, where".

At Claim 14, Column 13, Line 30, the phrase "Where the images" should instead read "where the images".

At Claim 17, Column 14, Line 20, the phrase "transparent HTML in the HTML" should instead read "transparent font in the HTML".

Signed and Sealed this
First Day of August, 2023

Katherine Kelly Vidal
*Director of the United States Patent and Trademark Office*